United States Patent [19]

Shida et al.

[11] Patent Number: 4,656,517
[45] Date of Patent: Apr. 7, 1987

[54] METHOD FOR INCREASING RESOLUTION OF ARRAY SENSOR AND SYSTEM THEREFOR

[75] Inventors: Junji Shida; Yoshio Ono, both of Kyoto; Ikuo Mitsuka, Shiga; Testuo Hoki, Kyoto; Akira Kuwabara, Shiga; Hitoshi Haibara; Takashi Sakamoto, both of Kyoto, all of Japan

[73] Assignee: Dainippon Screen Mfg. Co., Ltd., Kyoto, Japan

[21] Appl. No.: 736,634

[22] Filed: May 21, 1985

[30] Foreign Application Priority Data

May 23, 1984 [JP] Japan ................... 59-102614

[51] Int. Cl.⁴ ............................................. H04N 1/40
[52] U.S. Cl. ................................. 358/213; 358/294; 250/578
[58] Field of Search ............... 358/213, 212, 209, 227, 358/293, 294; 250/578; 354/476, 479, 478, 406

[56] References Cited

U.S. PATENT DOCUMENTS

| | | | |
|---|---|---|---|
| 3,872,484 | 3/1975 | Hashimoto et al. | 354/479 |
| 4,005,285 | 1/1977 | Price | 250/578 |
| 4,009,388 | 2/1977 | Seachman | 250/578 |
| 4,204,230 | 5/1980 | Sprague | 358/213 |
| 4,272,684 | 6/1981 | Seachman | 358/213 |
| 4,437,740 | 3/1984 | Suzuki et al. | 354/476 |

Primary Examiner—Gene Z. Rubinson
Assistant Examiner—Stephen Brinich
Attorney, Agent, or Firm—Zarley, McKee, Thomte, Voorhees & Sease

[57] ABSTRACT

The resolution of an array sensor can be increased by projecting images of picture elements, which lie on the same scanning line, on a plurality of one-dimensional array sensors composed of a number of photoelectric transducers arranged with an equal interval in a row; and then subjecting picture signals, which have been output respectively from the array sensors, to a combination processing so as to obtain continuous picture signals. It is possible, without using any memory unit, to output picture signals with a resolution higher than that available from the use of a single one-dimensional array sensor, namely, with a resolution proportional to the number of a plurality of one-dimensional array sensors.

2 Claims, 8 Drawing Figures

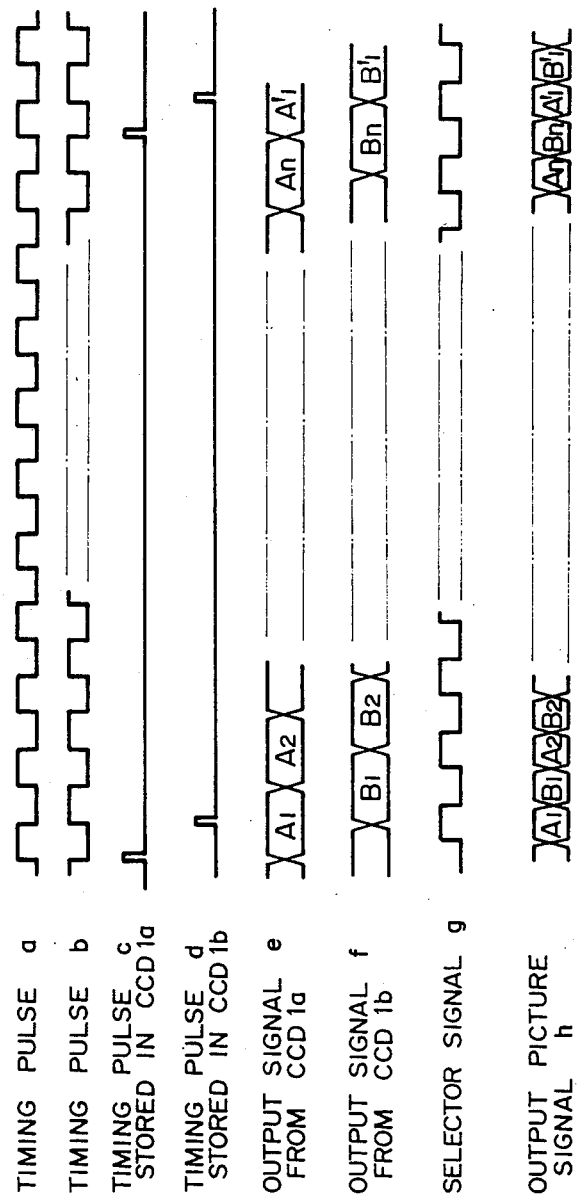

METHOD FOR INCREASING RESOLUTION OF ARRAY SENSOR AND SYSTEM THEREFOR

This invention relates to a method for increasing the resolution of a picture image by using a plurality of one-dimensional array sensors such as those composed of CCD image sensors arranged in rows.

The resolution of an image array sensor is obviously governed by the size and arrangement density of image sensors which make up the image array sensor. Reflecting the advance in the fabrication technology for semiconductor devices in recent years, it has become feasible to arrange devices of small dimensions at higher densities. Accordingly, the resolutions of image array sensors have been improved leapingly. However, the fabrication of image array sensors with such high resolutions requires high-level processing techniques and results unavoidably in a yield lower than those available for conventional image array sensors. Such high-resolution image array sensors are thus accompanied by a drawback that their fabrication costs are high. The prices of image array sensor having particularly high resolutions may in some instances become 1 figure higher than the prices of standard image array sensors with standard resolutions.

Depending on application purposes, image array sensors having the highest available resolutions may still be insufficient. Even if it is feasible to fabricate image array sensors such as those suited for such application purposes, their fabrication costs will obviously be still higher.

As one solution for such a demand, the present assignee filed on April 25, 1984 a Japanese patent application entitled "Picture Scanning Method". According to the method relied upon to increase the resolution in the above invention, a plurality of one-dimensional array sensors are arranged in parallel on the same plane. Images are projected through lenses or the like. The images are shifted in directions which are perpendicular to their corresponding array sensors. Furthermore, the devices making up of the respective array sensors are arranged with their positions shifted from one another. Owing to the above construction, the plurality of array sensors are able to detect images corresponding to their corresponding areas on the original picture, which areas are shifted little by little from one area to another. In the above manner, it is possible to increase the arrangement density of image sensors in a single image array sensor to a high level equivalent practically to the number of the array sensors, leading to an increased resolution.

The above-described means of the prior application is however accompanied by a problem that even if a plurality of one-dimensional array sensors are arranged as close as possible on the same plane, images corresponding to picture elements of an original picture on the same straight light (which is equivalent to a scanning line) cannot be projected simultaneously on the plurality of array sensors arranged at different positions when the images of the picture elements are projected on the array sensors through lenses or the like.

In order to combine signals output from the plurality of these one-dimensional image sensors into a single picture signal, there is a need to temporarily store a signal, which has been output from at least one one-dimensional image array sensor, in a memory and then to read it out in synchronization with a signal output output form the last one-dimensional image array sensor. Another drawback can thus be indicated that the overall construction becomes complex.

An object of this invention is to obtain picture signals with an increased resolution without need for a memory unit.

In one aspect of this invention, there is thus provided a method for increasing the resolution of an array sensor, which comprises:

projecting images of picture elements, which lie on the same scanning line, on a plurality of one-dimensional array sensors composed of a number of photoelectric transducers arranged with an equal interval in a row; and subjecting picture signals, which have been output respectively from the array sensors, to a combination processing so as to obtain continuous picture signals.

In another aspect of this invention, there is also provided a system for increasing the resolution of an array sensor, which comprises:

an optical system for optically scanning picture elements, which lie along the same scanning line on an original picture, to form a linear image as a bundle of rays;

means for dividing the bundle of rays into a plurality of ray bundles which travel respectively along light paths;

image array sensors the number of which is equal to the number of the light paths, said image array sensors being arranged with their relative positions shifted from one another so that the image array sensors receive the plurality of ray bundles and a plurality of phototransducers, which make up the image array sensors, receive alternately rays from the picture elements on the scanning line of the original picture and output picture signals corresponding to the picture elements; and means for subjecting the outputs from the plurality of image array sensors to a combination processing so as to output the picture signals, which correspond respectively to the picture elements, in the same order as the order in arrangement of the picture elements on the original picture.

Owing to the above-mentioned method and system of this invention, it is possible to output picture signals with a resolution higher than that available from the use of a single one-dimensional array sensor, namely, with a resolution proportional to the number of a plurality of one-dimensional array sensors by picking up images, which correspond respectively to adjacent picture elements along the same scanning line on the original picture, with the plurality of one-dimensional array sensors and then subjecting the resulting signals to a composition processing without using any memory unit.

The above and other objects, features and advantages of the present invention will become apparent from the following description and the appended claims, taken in conjunction with the accompanying drawings, in which:

FIG. 1a schematically shows the construction of an optical path according to the first embodiment of this invention;

FIG. 1b is a diagrammatic perspective view of the construction of the optical path of FIG. 1a;

FIG. 3 is a timing chart of each signal obtained from the circuit of FIG. 2;

Figure 4A:
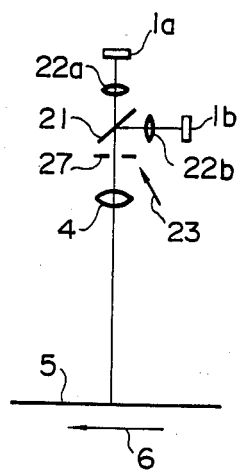
Figure 4B:
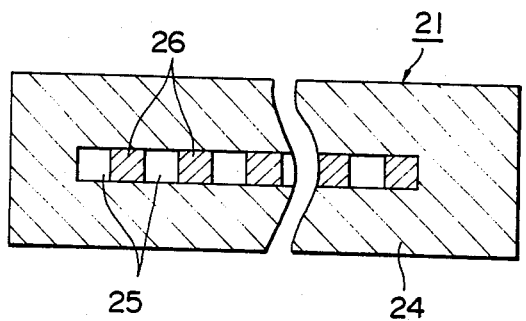
Figure 5:
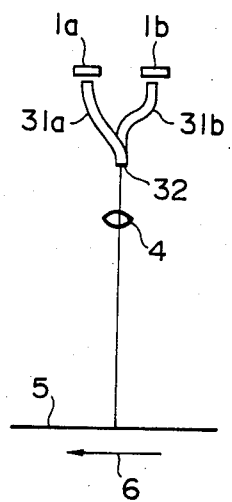
Figure 6:
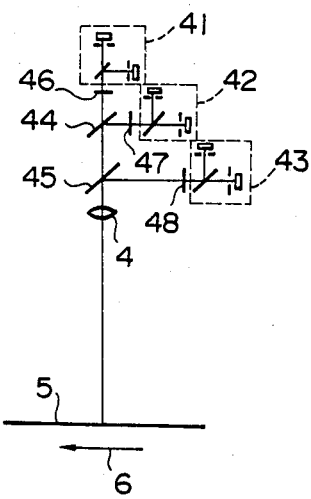

FIG. 4a schematically shows the construction of an optical path according to the second embodiment of this invention;

FIG. 4b is a front view of a reflecting mask employed in the construction of the optical path of FIG. 5 schematically shows the construction of an optical path according to the third embodiment of this invention; and FIG. 6 schematically shows the construction of an optical path according to the fourth embodiment of this invention.

Figure 1A:
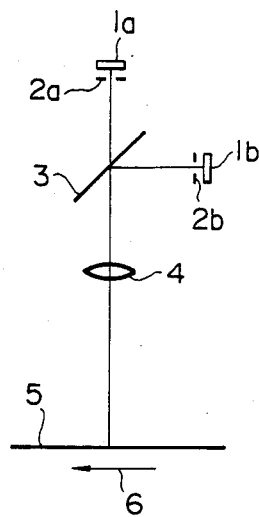
Figure 1B:
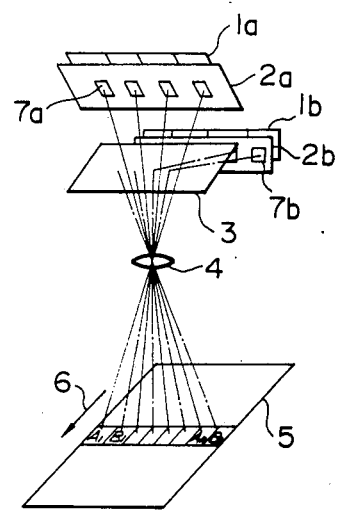

Referring FIGS. 1a and 1b which show the principle of the first embodiment of this invention, there are depicted one-dimensional CCD array sensors, namely, CCD image sensors 1a, 1b, aperture plates 2a, 2b, a half-mirror 3, a lens 4, an original picture 5, and an arrow 6 which indicates the travelling direction of the original picture 5. Through the aperture plates 2a, 2b, a number of apertures 7a, 7b are respectively bored with their positions shifted so that images of picture elements, which have been formed by finely dividing a linear region of the original picture, said linear region having been projected on the CCD image sensors 1a, 1b, are allowed to pass alternately through the apertures plates 2a, 2b.

In Figure 1b picture elements $A_1$, $B_1$, $A_2$, $B_2$, $A_n$, $B_n$ are illuminated from the underneath or from the upper right or left although no light source is shown in the drawing. Light which has transmitted through or has been reflected by the original picture travels through a lens 4 and is then divided by a half-mirror 3 into two optical paths, which are then respectively projected to the two aperture plates 2a, 2b to form images thereon. Through the aperture 2a, there are bored a number of apertures 7a through which lights from the picture elements $A_1$, $A_2$,....,$A_n$ are allowed to transmit. Picture element information corresponding to the elements $A_1$, $A_2$,....,$A_n$ is stored on the CCD image sensor 1a which is composed of a group of photodetectors arranged respectively in opposition to the apertures 7a.

On the other hand, picture element information corresponding to the picture elements B1,B2,....,Bn is stored in the CCD image sensor 1b by way of a bundle of rays which are reflected by the half-mirror 3 and are allowed to transmit through the number of apertures 7b of the aperture plate 2b.

Figure 2:
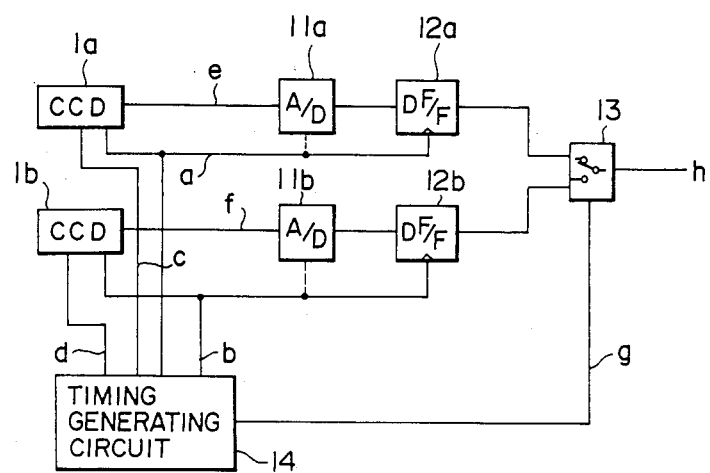
FIG. 2 is a circuit diagram according to the first embodiment of this invention, which is adapted to obtain CCD drive signals and output picture signals specifically.

These pieces of picture element information are combined by a circuit shown diagrammatically in FIG. 2, in which they are converted to picture element signals arranged by restoring their relative positions on the original picture 5, namely, in the order of $A_l B_l$, $A_2 B_2$, ...., $A_n$, $B_n$ The circuit illustrated by way of example in FIG. 2 is adapted to obtain the above-described composite signal. In FIG. 3, the timing chart shows the timing of each signal in the composite signal.

In FIG. 2, like reference numerals identify like elements of structure in FIG. 1. Besides, there are also shown A/D converters 11a, 11b, D flip-flops 12a, 12b, a selector 13 and a timing-pulse generating circuit 14.

By storing timing pulses c,d, picture element information are stored as electrical signals in the corresponding photodetecting cells of the one-dimensional CCD array sensor, i.e., the CCD image sensors 1a, 1b. These picture element information are output as picture element signals e,f in accordance with timing pulses a,b.

The picture element signals e,f are A/D converted respectively by the A/D converters 11a, 11b The timings of the resultant digital signals are adjusted respectively by the D flip-flops 12a, 12b, and the resulting digital signals are then input to the selector 13, The selector 13 chooses the signal e output from the CCD image sensor 1a, namely, the signals corresponding to the picture element information on the picture elements $A_l$, $A_2$,....,$A_n$ when the selector signal g from the timing-pulse generating circuit 14 is of the logical variable "1" level, but the signal f from the CCD image sensor 1b, namely, the signals corresponding to the picture element information on the picture elements $B_l$, $B_2$,....,$B_n$ when the selector signal g is of the logical variable "0" level.

Therefore, pieces of picture information are output in the order corresponding to the picture elements $A_l$, $B_l$, $A_2$, $B_2$,....,$A_n$, $B_n$ as shown in FIG. 3. Namely, picture signals can be output with a pitch one half of a picture element pitch available when picture signals are output only from one of the CCD array sensors, in other words, with a resolution twice that available from the single use of one of the CCD array sensors.

The original picture 5 is fed with a predetermined pitch in the direction indicated by the arrow 6 in synchronization with the timing pulses c,d in each scanning cycle. The above-mentioned image formation and signal combination are repeated in every scanning cycle so that the entire area of the original picture is scanned. Needless to say, the original picture 5 may be fed continuously instead of its intermittent feeding.

The operation of the above embodiment has been described using digital signals. Analog signals from the CCD image sensors 1a, 1b may however be used as they are, provided that the selector 13 is replaced by an analog signal selector such as analog switch. In this case, picture signals having a resolution twice that available from the use of only one of the CCD image sensors 1a, 1b will be obtained from the analog signal selector.

In passing, it should be borne in mind that in the present embodiment, the objects of this invention can still be achieved without the aperture plates 2a, 2b. However, the use of the aperture plates 2a, 2b leads to an improvement to the separation of adjacent pieces of picture element information, whereby bringing about such an advantageous effect that the resolution can be improved further.

The second embodiment of this invention will be described with reference to FIGS. 4a and 4b, in which like reference numerals identify like elements of structure in FIG. 1.

The second embodiment is different from the first embodiment in that the second embodiment is equipped with a reflecting mask 21 instead of the half-mirror 3 and auxiliary lenses 22a, 22b in place of the aperture plates 2a, 2b and additionally includes a slit 27 arranged between the lens 4 and reflecting mask 21.

FIG. 4b is a front view which illustrates the details of the reflecting mask 21. In a non-reflecting surface 24, a number of light-transmitting portions, for example, apertures 25 and totally-reflecting mirror areas 26 are arranged alternately with a predetermined pitch.

Similar to the first embodiment, the picture elements $A_1$, $B_1$, $A_2$, $B_2$,....,$A_n$, $B_n$ on the original picture 5 are illuminated by an unillustrated light source and their images are projected by the lens 4, through the slit 27, onto the reflecting mask 21.

Of the images of the picture elements which have been projected on the reflecting mask 21, the ray bundles from the picture elements $A_1$, $A_2$, ...,$A_n$ pass through the apertures 25 located at the corresponding positions on the reflecting mask 21 and are then focused by the lens 22a on the surface of the one-focused dimensional CCD array sensor, i.e., CCD image sensor 1a, in which the pieces of picture element information on the 5 picture elements $A_1, A_2,...,A_n$ are stored.

The pieces of picture element information stored in the CCD image sensors 1a, 1b are processed in the same manner as in first embodiment, resulting similarly in the production of picture signals having a resolution twice that available from use of only one of the CCD image sensors 1a, 1b.

FIG. 5 shows the third embodiment of this invention, in which like reference numerals identify like elements of structure in FIG. 1. Numerals 31a and 31b indicate light guides which have been formed by bundling glass fibers alternately.

Similar to the first and second embodiments, the picture elements $A_1, B_1, A_2, B_2,..., A_n, B_n$ on the original picture 5 are illuminated by an unillustrated light source and their images are projected and focused on end faces 32 of the glass fibers arranged in a row.

Of these images corresponding to the picture elements, the images corresponding to the picture elements $A_1, A_2,...,A_n$ arrive at the corresponding cells of the one-dimensional CCD array sensor, i.e., the CCD image sensor 1a through the glass fiber bundle 31a which has been formed by bundling every first glass fiber (or every first group of glass fibers), thereby storing the pieces of picture element information corresponding to the picture elements $A_1, A_2,..., A_n$ in the CCD image sensor 1a.

On the other hand, the images corresponding to the picture elements elements $B_1, B_2,...,B_n$ arrive at the corresponding cells of the one-dimensional CCD array sensor, i.e., the CCD image sensor 1b through the glass fiber bundle 31b which has been formed by bundling every second glass fiber (or every second group of glass fibers), thereby storing the pieces of picture element information corresponding to the picture elements $B_1, B_2,..., B_n$ in the CCD image sensor 1b.

The pieces of picture element information stored respectively in the CCD image sensors 1a, 1b are processed in the same manner as in the above-described embodiments, resulting similarly in the production of picture signals having a resolution twice that available from use of only one of the CCD image sensors 1a, 1b.

FIG. 6 illustrates by way of example the present invention incorporated in a picture-scanning and color-separating apparatus, namely, in means for photoelectrically scanning an original color picture and outputting color-separated picture signals of red(R), green(G) and blue(B).

In FIG. 6, there are illustrated three sets of picture signal outputting units 41,42,43, each of which is equivalent to the combination of the one-dimensional CCD array sensor, namely, CCD image sensor 1, aperture plate 2 and half-mirror 3.

Although the picture signal outputting units are depicted following the construction of the above-described first embodiment, no problem or inconvenience will be encountered if the picture signal outputting unit 41,42,43 are constructed in accordance with the construction of the second embodiment shown in FIG. 2 or the third embodiment illustrated in FIG. 5.

Numerals 44 and 45 indicate half-mirrors or dichroic mirrors, whereas numerals 46, 47 and 48 designate color separation filters. When it is desired to obtain the above-mentioned three types of color-separated separated signals, it is necessary to use three types of color filters, namely, color filters (R), (G) and (B).

Owing to the above-described construction, color-separated picture signals (R),(G),(B) are output respectively from the three sets of the picture signal outputting units 41,42,43. Furthermore, these color-separated picture signals can be output with a resolution twice that available from the use of a single CCD image sensor.

In each of the above embodiments, the resolution has been increased to the level twice that available from the use of a single CCD image sensor by using two image array sensors in combination. It should however be borne in mind that the number of image array sensors arranged side by side is not limited to 2 but three or more image array sensors may also be used. By using three or more image array sensors, it is possible to obtain a resolution increased in proportion to the number of the image array sensors provided side by side.

In each of the above embodiments, the resolution has been increased to the level twice that available from the use of a single image array sensor by arranging two image array sensors with their positions shifted by a distance equivalent to one half of the arrangement pitch of the one-dimensional CCD array sensors, i.e., the CCD image sensors which make up the two image array sensors. In the same manner, the resolution can thus be increased to a level three times that available from the use of a single image array sensor if three image array sensors are arranged with their relative positions shifted by a distance equivalent to one third of the arrangement pitch of the one-dimensional CCD array sensors, i.e., the CCD image sensors which make up the three image array sensors.

The resolution can be increased further if more image array sensors are employed. From the practical viewpoint, use of many image array sensors is accompanied by difficulties in making the optical system and in addition, results in an increase in production cost due to the increased number of parts. Thus, there is obviously a limitation to the number of image array sensors usable in accordance with the present invention.

As apparent from the foregoing, the present invention has the following advantageous effects.

(1) By using a plurality of image array sensors which are being made as standard parts and are thus readily available, it is possible to output picture signals with an integer multiple of the resolution available upon using only one image array sensor.

(2) Outputs from a plurality of sensors are combined together into a single picture signal. The variations in the photoelectric conversion characteristics of the individual image array sensors are thus averaged, thereby making it possible to use the image array sensors as if they have the same characteristics. This feature is advantageous particularly upon color separation of original color pictures (3) The present invention does not require the memory unit which is essential for the means of the earlier application, which has commonly been assigned to the present assignee, referred to in the beginning of the present specification.

(4) Especially in the case of the embodiment shown in FIG. 4, the loss of light quantity by the half-mirror has been minimized. This permits still faster scanning. This embodiment has another advantage that its fabrication is easy because the relative positional adjustment between the image array sensors can be achieved only by adjusting the relative positions between the glass fiber bundles and the array sensors.

(5) Owing to the provision of the apertures, the separation of adjacent pieces of picture element information has been facilitated and the resolution has hence been improved.

Having now fully described the invention, it will be apparent to one of ordinary skill in the art that many changes and modifications can be made thereto without departing from the spirit or scope of the invention as set forth herein.

We claim:

1. A method for increasing the resolution of an array sensor, which comprises:
    projecting images of picture elements on the identical scanning line through a reflecting mask with alternately-arranged apertures and reflecting areas so that images of picture elements among said images passing through said apertures may be projected onto a first one-dimensional array sensor;
    projecting reflected images of picture elements which are reflected by the reflecting surfaces of said reflecting mask onto a second one-dimensional array sensor; and improving resolving power of scanned picture images by outputting said images from said first and second one-dimensional array sensors array sensors into continuous picture image signals and synthesizing said picture image signals on the scanning line to the disposition order of said picture elements.

2. A system for increasing the resolution of an array sensor, which comprises:
    an optical system for optically scanning picture elements, which lie along the same scanning line on an original picture, to form a linear image as a bundle of rays;
    means for dividing the bundle of rays into alternating picture elements on the scanning line of the original picture, said means including a reflecting mask with alternately-arranged apertures and reflecting areas;
    a plurality of image array sensors for receiving said alternating picture elements from said dividing means and for outputting picture image signals corresponding to said picture elements; and
    means for synthesizing said picture image signals from said plurality of image array sensors and outputting the picture image signals on the scanning line according to the disposition order of said picture elements.

* * * * *